US 6,526,816 B2

(12) United States Patent
Genise et al.

(10) Patent No.: US 6,526,816 B2
(45) Date of Patent: Mar. 4, 2003

(54) TRANSMISSION GEAR LIFE MONITOR SYSTEM

(75) Inventors: Thomas A. Genise, Dearborn, MI (US); Douglas C. Gooch, Richland, MI (US); Kevin D. Snow, Augusta, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/681,057

(22) Filed: Dec. 13, 2000

(65) Prior Publication Data
US 2002/0095985 A1 Jul. 25, 2002

(51) Int. Cl.[7] .............................................. G01M 15/00
(52) U.S. Cl. ................................................... 73/118.1
(58) Field of Search ......................... 73/116, 117.2, 73/117.3, 118.1; 340/438, 441

(56) References Cited

U.S. PATENT DOCUMENTS

| 5,272,939 A | * | 12/1993 | Markyvech et al. |
| 5,272,939 A | * | 12/1994 | Markyvech et al. |
| 5,487,005 A | * | 1/1996 | Genise |
| 5,509,867 A | * | 4/1996 | Genise |
| 5,620,392 A | * | 4/1997 | Genise |
| 6,116,105 A | * | 9/2000 | Genise et al. |
| 6,128,959 A | | 10/2000 | McGovern et al. ............ 73/660 |
| 6,178,366 B1 | * | 1/2001 | Janecke et al. |
| 6,205,389 B1 | * | 3/2001 | Genise |

* cited by examiner

Primary Examiner—Eric S. McCall
(74) Attorney, Agent, or Firm—Rader, Fishman & Grauer PLLC

(57) ABSTRACT

An integral gear life monitor system and method for determining gear use and damage is disclosed. The system includes a first and second sensors for measuring the rotational speed and torque of a driveline component, such as an input shaft of a vehicle transmission, for a particular gear ratio at one or more time intervals over a period of time. Each time interval may be in the range of 40 ms to 100 ms. The period of time may be hours, days, month, or even years. A processor performs a statistical summation technique to transform the signals from the first and second sensors into an equivalent amount time for the particular gear ratio during that period of time. A driveline vibration analyzer can perform an online determination of the torsional vibrations for the particular gear ratio to determine whether vibration is a root cause of why a gear ratio is worn or damaged. The transformed signals can be stored in a non-volatile memory of the processor for later retrieval as a diagnostic tool to statistically measure the amount of life used by each gear ratio, to determine if a gear ratio is worn or damaged, to determine the root cause of why a gear ratio is worn or damaged, and to take proactive and/or reactive measures to extend the life of the transmission.

20 Claims, 1 Drawing Sheet

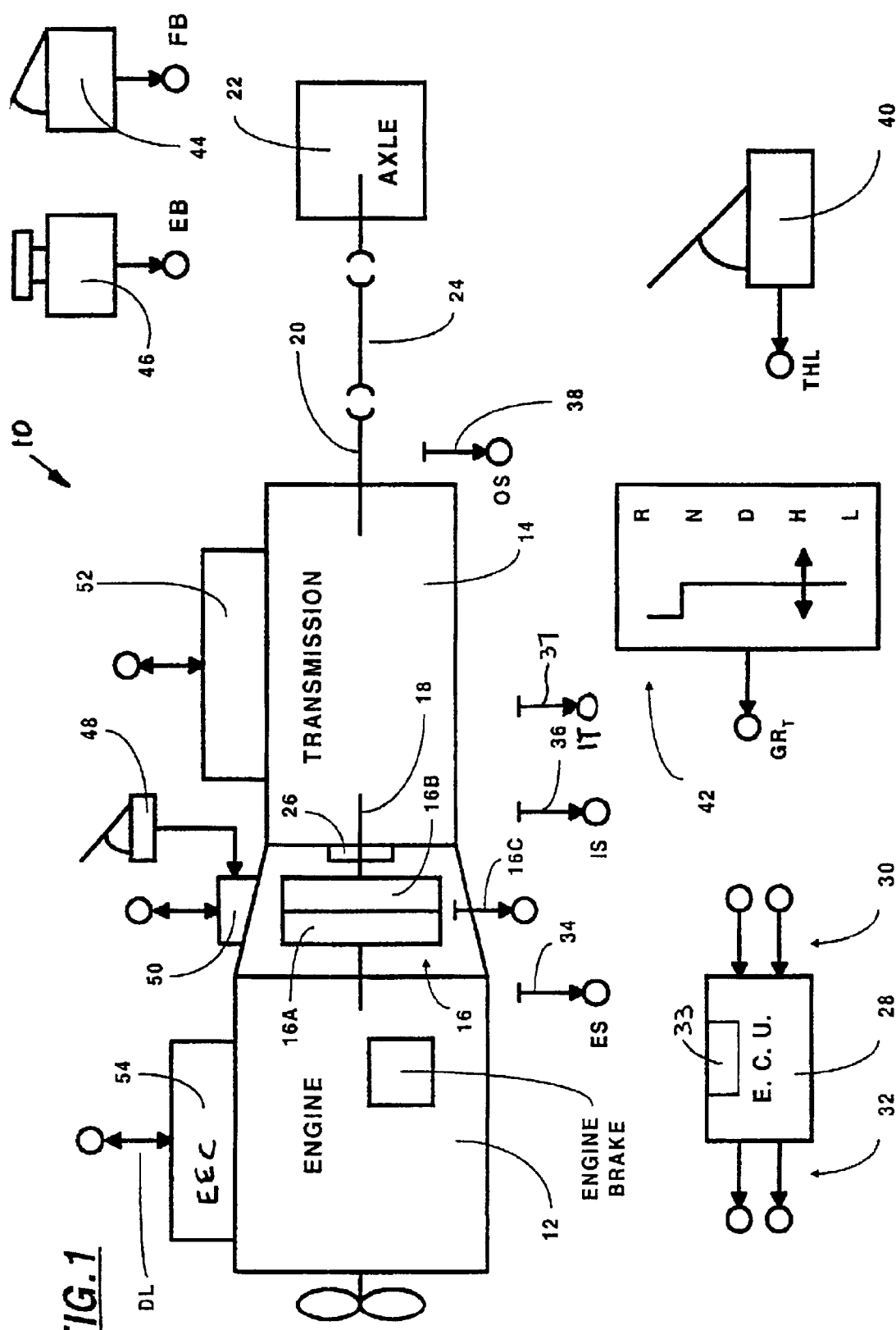

TRANSMISSION GEAR LIFE MONITOR SYSTEM

FIELD OF INVENTION

The present invention relates in general to vehicle transmission diagnostics and, more particularly, to method and system for measuring an evaluating gear life for a particular gear ratio in a vehicle transmission.

BACKGROUND OF INVENTION

It is well-known that the vehicle accumulates gear use or damage of the transmission while being driven. In the past, automated transmission technology made it very difficult, or impossible, to know how much gear life is remaining in a given gear ratio, or whether a given ratio is worn or damaged, or to determine the duty life history of each gear ratio. Thus, it would be desirable to provide a monitor system that can statistically measure the amount of life used by each gear ratio to determine if a gear ratio is worn or damaged, to determine the root cause of why a gear ratio is worn or damaged, and to take proactive and/or reactive measures to extend the life of the transmission.

SUMMARY OF INVENTION

The invention relates to a method and system of determining how much gear life is remaining in a given gear ratio of a vehicle transmission. A rotational speed and torque of a rotating component, such as an input shaft of the vehicle transmission, is measured by sensors at a plurality of time intervals for a period of time. The time interval can be between 40 ms and 100 ms and the period of time can be hours, days, months, or even years. A processor is electrically coupled to the sensors to transform the signals from the sensors into an equivalent amount of time for the given gear ratio. The torque and speed events or instances can also be stored in bins of a non-volatile memory of the processor for later retrieval to determine if a gear ratio is worn or damaged, to determine the root cause of why a gear ratio is worn or damaged, and to take proactive and/or reactive measures to extend the life of the transmission.

Various aspects and advantages of this invention will become apparent to those skilled in the art from the following detailed description of the preferred embodiment, when read in light of the accompanying drawings.

BRIEF DESCRIPTION OF DRAWINGS

FIG. 1 is a schematic illustration, in block diagram format, of an automated mechanical transmission system utilizing the integral gear life monitor system of the invention.

DETAILED DESCRIPTION

Referring now to the drawings, there is schematically illustrated in FIG. 1 an at least partially automated mechanical transmission system 10 intended for vehicular use. The automated transmission system 10 includes a fuel-controlled engine 12 (such as a well-known diesel engine or the like), a multiple-speed, change-gear transmission 14, and a non-positive coupling 16 (such as a friction master clutch) drivingly interposed between the engine and the input shaft 18 of the transmission. The transmission 14 may be of the compound type comprising a main transmission section connected in series with a splitter-and/or range-type auxiliary section. Transmissions of this type, especially as used with heavy-duty vehicles, typically have 6, 7, 8, 9, 10, 12, 13, 16 or 18 forward speeds. Examples of such transmissions may be seen by reference to U.S. Pat. Nos. 5,390,561 and 5,737,978, the disclosures of which are incorporated herein by reference.

A transmission output shaft 20 extends outwardly from the transmission 14 and is drivingly connected with the vehicle drive axles 22, usually by means of a prop shaft 24. The illustrated master friction clutch 16 includes a driving portion 16A connected to the engine crankshaft/flywheel and a driven portion 16B coupled to the transmission input shaft 18 and adapted to frictionally engage the driving portion 16A. See U.S. Pat. Nos. 5,634,541; 5,450,934 and 5,908,100, herein incorporated by reference. An upshift brake 26 (also known as an input shaft brake or inertia brake) may be used for selectively decelerating the rotational speed of the input shaft 18 for more rapid upshifting, as is well known. Input shaft or upshift brakes are known in the prior art, as may be seen by reference to U.S. Pat. Nos. 5,655,407 and 5,713,445, herein incorporated by reference.

A microprocessor-based electronic control unit (or ECU) 28 is provided for receiving input signals 30 and for processing same in accordance with predetermined logic rules to issue command output signals 32 to various system actuators and the like. Microprocessor-based controllers of this type are well known, and an example thereof may be seen by reference to U.S. Pat. No. 4,595,986, herein incorporated by reference. A Driveline Vibration Analyzer (DVA) 33 can be installed in the EDU 28 for processing the transmission output shaft, signal (OS) for input of its calculations in accordance with predetermined logic rules. The DVA 33 is described in co-assigned U.S. Pat. No. 6,128,959, filed on Aug. 13, 1998, the disclosure of which is herein incorporated by reference.

System 10 includes a rotational speed sensor 34 for sensing rotational speed of the engine and providing an output signal (ES) indicative thereof, a rotational speed sensor 36 for sensing the rotational speed of the input shaft 18 and providing an output signal (IS) indicative thereof, a torque sensor 37 for sensing the torque of the input shaft 18 and providing an output signal (IT), and a rotational speed sensor 38 for sensing the rotational speed of the output shaft 20 and providing an output signal (OS) indicative thereof. A sensor 40 may be provided for sensing the displacement of the throttle pedal and providing an output signal (THL) indicative thereof. A shift control console 42 may be provided for allowing the operator to select an operating mode of the transmission system and for providing an output signal (GR$_T$) indicative thereof.

As is known, if the clutch is engaged, the rotational speed of the engine may be determined from the speed of the input shaft and/or the speed of the output shaft and the engaged transmission ratio (ES=IS=OS* GR$_T$)

System 10 also may include sensors 44 and 46 for sensing operation of the vehicle foot brake (also called service brake) and engine brakes, respectively, and for providing signals FB and EB, respectively, indicative thereof.

The master clutch 16 may be controlled by a clutch pedal 48 or by a clutch actuator 50 responding to output signals from the ECU 28.

Alternatively, an actuator responsive to control output signals may be provided, which may be overridden by operation of the manual clutch pedal. In the preferred embodiment, the clutch is manually controlled and used only to launch and stop the vehicle (see U.S. Pat. Nos. 4,850,236; 5,272,939 and 5,425,689, herein incorporated by reference). The transmission 14 may include a transmission actuator 52, which responds to output signals from the ECU 28 and/or which sends input signals to the ECU 28 indicative of the selected position thereof. Shift mechanisms of this type, often of the so-called X-Y shifter type, are known in the prior art, as may be seen by reference to U.S. Pat. Nos. 5,305,240 and 5,219,391, herein incorporated by reference. Actuator 52 may shift the main and/or auxiliary section of transmission 14. The engaged and disengaged (ie., not engaged) condition of clutch 16 may be sensed by a position sensor 16C or may be determined by comparing the speeds of the engine (ES) and the input shaft (IS).

Fueling of the engine is preferably controlled by an electronic engine controller 54, which accepts command signals from and/or provides input signals to the ECU 28. Preferably, the engine controller 54 will communicate with an industry standard data link DL which conforms to well-known industry protocols such as SAEJ1922, SAE 1939 and/or ISO 11898. The ECU 28 may be incorporated within the engine controller 54.

In addition, the ECU 28 may be electrically coupled to the input sensor 36 and the output sensor 38 to receive input speed (IS) and the output speed (OS) signals, respectively. It will be appreciated that the invention is not limited by the ECU 28 receiving signals from the input and output sensors of the transmission, and that the invention can be practiced by the ECU 28 receiving signals from any rotating component of interest in the vehicle driveline.

By using a statistical summing technique of the invention, the Hours for each gear ratio for each component in the vehicle driveline when torque is applied at some rotational speed in that particular gear ratio can be summed as follows:

$$Hours = \frac{\sum (R_i T_i^x)}{(S_R T_R^x)}$$

where, Hours=equivalent hours at $S_R$ input speed and $T_R$ input torque for that particular gear ratio of the transmission; R=number of input shaft revolutions or rotational speed of the transmission at input torque T during event i; T=input shaft torque of the transmission during event i; $S_R$ reference input rotational speed of the transmission; $T_R$=reference input torque of the transmission; X=exponent used depending on the component (gear, bearing, etc.) and failure mode (gear bending, gear pitting, etc.) being studied. For example, the X is equal to 3.0 for ball bearings, 3.33 for roller bearings, 5.68 for gear pitting and 10.0 for gear bending.

Each instance or event of the rotational speed and input shaft torque for a particular gear ratio is summed and stored during operation in real-time and saved during power off in a non-volatile memory in ECU 28. When the clutch is engaged, the input shaft torque, T, is substantially equal to the torque at the flywheel. A method of determining torque at the flywheel is disclosed in U.S. Pat. No. 5,509,867, the disclosure of which is herein incorporated by reference. Alternatively, the input shaft torque can be measured by the sensor 37. The time interval for summing and storing each instance or event in ECU 28 can be any desired time interval. For example,.the time interval between each event or instance may be between 40 ms and 100 ms. The summing and storing of events or instances continues when system power is restored.,The summing and storing can continue for weeks, months, or even years of operation.

The data stored in ECU 28 can later be retrieved, analyzed and compared to predict gear life at the reference torque and speed to see how much gear life is used and how much gear life still remains for each gear ratio. The data stored in ECU 28 can be used to determine the root cause of damage or wear to each gear ratio. For example, the data can be analyzed can be used to determine whether the root cause of the damage or wear to each gear ratio was attributed to a given route taken by the operator. Thus, the date retrieved can provide valuable debug information and pinpoint the root cause of damage or wear to a particular gear ratio that is responsible for decreasing gear life.

The torque and speed events or instances can also be stored in bins for later retrieval to determine how often and/or how much the vehicle is driven in that gear for a particular range of torque and speed. For example, a bin may consist of a torque in the range of 300 to 500 ft-lbs. or an engine speed in the range of 2000 to 2100 rpm. It will be appreciated that the invention is not limited by the number of bins, and that the invention can be practiced by storing torque and speed events or instances in any desired number of bins.

There are many actions that can be taken based on the results from the method of the invention. For example, actions can be taken during operation of the transmission to either avoid a particular gear ratio, or limit engine torque in that particular gear ratio to prolong the life of the transmission. In addition, the DVA 33 can analyze driveline torsional vibrations online while in each gear ratio to determine whether excessive vibration is a root cause of why a particular gear is worn or damaged. Further, technicians can upload the stored data and/or monitor the gear ratio in operation to diagnose the potential problem. Also, information can be gained on how the transmission is used in a particular application. For example, information can be obtained as to the speed and torque profile for each gear ratio, as well as how much time the vehicle is used in each gear ratio.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A transmission integral gear life monitor system, comprising:
    a first sensor for measuring a rotational speed of a rotating component in a vehicle driveline for a particular gear ratio and generating a first signal;
    a second sensor for measuring a torque of the rotating component in the vehicle driveline for the particular gear ratio and generating a second signal; and
    a processor electrically coupled to the first and second sensors for determining a gear life that is remaining in the particular gear ratio by using the first and second signals to determine an equivalent amount of time of gear life for the particular gear ratio.

2. The gear life monitor system according to claim 1, wherein the rotating component is a transmission input shaft.

3. The gear life monitor system according to claim 1, wherein a statistical summation technique is used to determine the equivalent amount of time of gear life for the particular gear ratio.

4. The gear life monitor system according to claim 1, wherein the equivalent amount of time is stored for a range of rotational speeds of the rotating component.

5. The gear life monitor system according to claim 1, wherein the equivalent amount of time is stored for a range of torque of the rotating component.

6. The gear life monitor system according to claim 1, wherein the first and second sensor measure rotational speed and torque at an interval of time in a range of 40 ms and 100 ms.

7. The gear life monitor system according to claim 1, further including a driveline vibration analyzer for analyzing torsional vibrations for the particular gear ratio to determine whether vibration is caused by a worn or damaged gear.

8. A gear life monitor system for a transmission of a vehicle driveline, comprising:
   a first sensor for measuring a rotational speed of a rotating component during one or more interval of times for a particular gear ratio and generating a first signal for each interval of time;
   a second sensor for measuring a torque of the rotating component during the one or more intervals of time for the particular gear ratio and generating a second signal for each interval of time; and
   a processor electrically coupled to the first and second sensors for determining a gear life that is remaining in the particular gear ratio by performing a statistical summation technique of the first and second signals for each interval of time to determine an equivalent amount of time of gear life for the particular gear ratio.

9. The gear life monitor system according to claim 8, wherein the rotating component is a transmission input shaft.

10. The gear life monitor system according to claim 8, wherein the equivalent amount of time is stored for a range of rotational speeds of the rotating component.

11. The gear life monitor system according to claim 8, wherein the equivalent amount of time is stored for a range of torque of the rotating component.

12. The gear life monitor system according to claim 8, wherein each interval of time is in a range of 40 ms and 100 ms.

13. The gear life monitor system according to claim 8, further including a driveline vibration analyzer for analyzing torsional vibrations for the particular gear ratio to determine whether vibration is caused by a worn or damaged gear.

14. A method of determining a gear life in a transmission, comprising the steps of:
   sensing a rotational speed of a rotating component in a vehicle driveline during one or more intervals of time for a particular gear ratio and generating a first signal at each time interval;
   determining a torque of the rotating component in the vehicle driveline during the one or more intervals of time for the particular gear ratio and generating a second signal at each time interval; and
   using the first and second signals to determine an equivalent amount of time of gear life for the particular gear ratio.

15. The method of claim 14, further including the step of analyzing torsional vibrations for the particular gear ratio to determine whether vibration is caused by a worn or damaged gear.

16. The method of claim 14, further including the step of storing the transformed first and second signals in a non-volatile memory of a processor.

17. The method of claim 14, wherein each interval of time is in a range of 40 ms and 100 ms.

18. The gear life monitor system according to claim 3, wherein the statistical summation technique is as follows:

$$Hours = \frac{\sum (R_i T_i^x)}{(S_R T_R^x)}$$

where,
   Hours="equivalent" hours at "$S_R$" input speed and "$T_R$" input torque for the particular gear ratio of the vehicle driveline,
   R=rotational speed of the vehicle driveline at input torque "T" during event "i";
   T=input shaft torque of the vehicle driveline during event "i";
   $S_R$=reference input rotational speed of the vehicle driveline;
   $T_R$=reference input torque of the vehicle driveline; and
   X=exponent value.

19. The gear life monitor system according to claim 8, wherein the statistical summation technique is as follows:

$$Hours = \frac{\sum (R_i T_i^x)}{(S_R T_R^x)}$$

where,
   Hours="equivalent" hours at "$S_R$" input speed and "$T_R$" input torque for the particular gear ratio of the vehicle driveline;
   R=rotational speed of the vehicle driveline at input torque "T" during event "i";
   T=input shaft torque of the vehicle driveline during event "i";
   $S_R$=reference input rotational speed of the vehicle driveline;
   $T_R$=reference input torque of the vehicle driveline; and
   X=exponent value.

20. The method of claim 14, wherein the gear life that is remaining in the particular gear ratio is determined using a statistical summation technique as follows:

$$Hours = \frac{\sum (R_i T_i^x)}{(S_R T_R^x)}$$

where,
   Hours="equivalent" hours at "$S_R$" input speed and "$T_R$" input torque for the particular gear ratio of the vehicle driveline;
   R=rotational speed of the vehicle driveline at input torque "T" during event "i";
   T=input shaft torque of the vehicle driveline during event "i";
   $S_R$ reference input rotational speed of the vehicle driveline;
   $T_R$=reference input torque of the vehicle driveline; and
   X=exponent value.

* * * * *